Dec. 10, 1963  J. L. WRENN  3,113,460
TIRE PRESSURE GAUGE
Filed Oct. 31, 1960
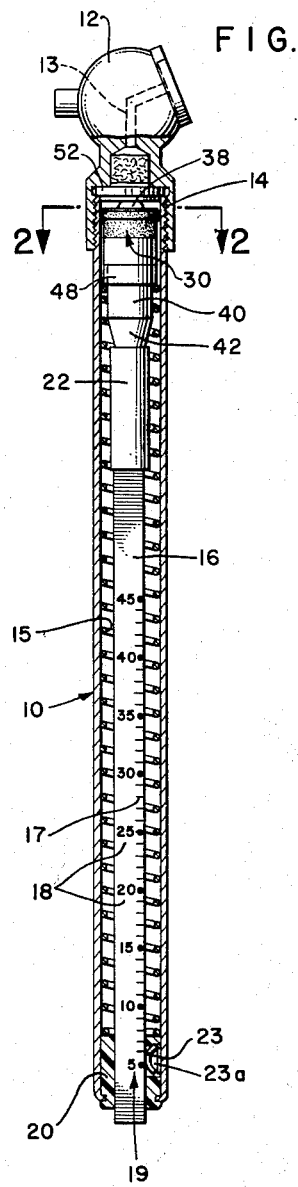
FIG. 1.
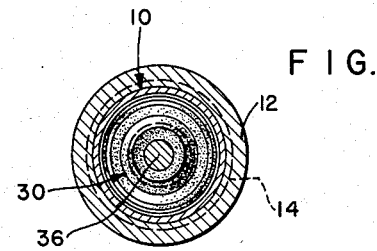
FIG. 2.
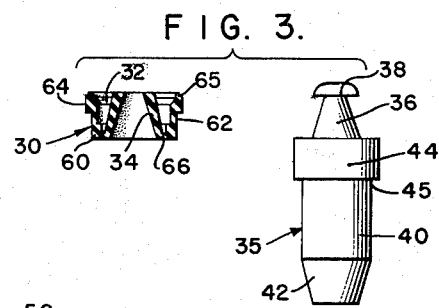
FIG. 3.
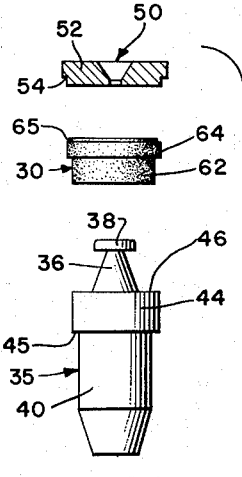
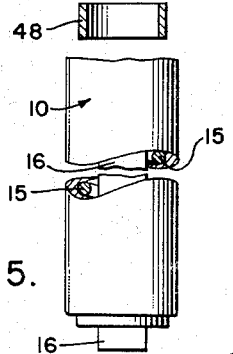
FIG. 4.
FIG. 5.
INVENTOR.
JACK L. WRENN
BY
ATTORNEY United States Patent Office 3,113,460
Patented Dec. 10, 1963

3,113,460
TIRE PRESSURE GAUGE
Jack L. Wrenn, Montebello, Calif., assignor to Mrs. U. Z. Fowler, 5123 Via Corona, Los Angeles, Calif.
Filed Oct. 31, 1960, Ser. No. 66,042
2 Claims. (Cl. 73—419)

This invention relates to tire air pressure gauges in general. More particularly, the invention involves a self-sealing yieldable cup and piston combination, like that at the valve-engaging end of automobile tire pressure gauges, or similar devices.

One object of the invention is to provide a yieldable sealing cup for tire gauges which is self-acting in operation to seal against the inner cylindrical wall of the barrel of a conventional tire gauge.

Another object of the invention is to provide such a yieldable seal which is of cup-like construction and which acts to produce sealing effects of the indicated nature, without the need of assistance from any auxiliary mechanical element such as a coil spring, or a spring working in conjunction with a metallic cup-expanding washer or the like.

A further object of the invention is to provide an effective and efficient self-sealing yieldable cup and piston or plunger combination readily installable in the barrel of a typical air gauge and operable therewithin for indicating air pressures supplied to automobile tires and the like.

A still further object is to provide a yieldable self-sealing or equivalent cup for use in tire pressure gauges and similar structures which provides a bearing base for seating on a shoulder of a tire gauge piston or plunger and contains also a central or axial sealing sleeve to snap over an outstanding stem of such piston or plunger, and additionally includes a peripheral upstanding yielding flange especiallly constructed and adapted for self-sealing engagement with the inner cylindrical wall of a tire pressure gauge barrel of conventional or similar nature.

Other objects of the invention and various features of construction will become apparent to those skilled in the art, upon reference to the following specification and the accompanying drawing, wherein certain embodiments of the invention are illustrated.

In the drawing:

FIGURE 1 is principally a vertical section through a tire gauge equipped with the present improvement;

FIG. 2 is a cross-section taken on the line 2—2 of FIG. 1;

FIG. 3 is a two-part expanded view showing two important elements of the invention in side-by-side relationship;

FIG. 4 is an assembly view, partly in elevation and partly in section, of the two elements shown in FIG. 3; and FIG. 5 is an exploded view in axial alignment of the principal parts of FIGS. 1 and 4.

This invention resides in the combination of an improved cup and piston mechanism with conventional parts of an air-pressure or tire-pressure gauge, all of which are so related as to improve the operation of the entire combination as a whole, and also resides in the improved cup and piston mechanism itself.

FIGS. 1, 2 and 5 illustrates a tire-pressure gauge barrel or tube 10 which carries at its upper or valve-engaging end a gauge head 12 of any standard or preferred construction, such head being attached to the barrel 10 through the medium of conventional screw threads 14. The head 12 possesses an air passage 13 for admitting air under pressure to the interior of the barrel. The barrel 10 contains a helical compression spring 15 which is disposed about a projectable gauge rod or bar 16 provided with a scale 19, gauge marks 17 and appropriate indicia 18. The gauge bar 16 is typically square or flat and its outer end projects through a correspondingly shaped aperture in a guide and centering block 20 fixed in the outer end of the gauge barrel 10. However, the inner or upper end of the gauge bar 16 is desirably in the form of a cylindrical portion 22 located within the upper portion of the spring 15. Some form of friction device, such as an arcuate spring member 23 in a lateral passage 23a of the block 20, is employed to restrain the gauge bar 16 against free sliding movement when the bar has been forcefully moved to a position in the block 20. For this purpose the spring member 23 shown is D-shaped wherein one end of the straight portion is free and the arcuate portion bears against the side of the bar 16 and the spring as a whole is compressed between the gauge bar 16 and the barrel 10.

The present improvement resides principally in the two parts seen especially in FIGS. 3 and 4. One of these parts is a molded, self-sealing yieldable rubber snap-on piston cup 30 which is cylindrical in elevation as best indicated in FIG. 5 and is circular in plan as seen in FIG. 2, the axial vertical section of this cup being illustrated in FIGS. 3 and 4 which also indicate that the air chamber 32, provided for application of sealing air to the cup, is annular because of the fact that the central or axial portion of the self-sealing yielding cup 30 is in the form of an upstanding frusto-conical sleeve 34.

The other important element illustrated by these figures is a somewhat elongated piston or plunger 35 which, in operation, receives the self-sealing cup 30 upon an upstanding frusto-conical stem or stud 36 which is provided at its outer end with an integral snap-over head 38. The piston or plunger 35 includes a cylindrical body 40 adapted to enter and to fit loosely within the upper end of the helical spring 15. A lower extension 42 of the cylindrical body 40 is tapered somewhat for seating contact with the top of the cylindrical portion 22 of the gauge rod or bar 16. This relationship is best indicated in FIG. 1. Above the cylindrical body 40 of the piston 35 there is provided a somewhat larger cylindrical extension 44 from which the frusto-conical stem 36 integrally extends. This arrangement of the cylindrical extension 44 thus provides an undercut shoulder 45 and an upwardly directed somewhat larger shoulder 46 around the stem 36, both of these shoulders 45 and 46 being annular. The shoulder 45 may provide a seat for the upper end of the spring 15, but in the preferred form illustrated, a relatively short ring or sleeve 48, which slides up over the body 40, is used as a bearing for the upper end of the spring 15, as seen in FIG. 1.

In operation, the assembled piston 35 and self-sealing yieldable cup 30 are forced downward against the coil spring 15 by the action of air under pressure applied, as from a valve, through the passage 13 in the head 12. Such air under pressure is received against the cup 30 by way of a central aperture 50 in a metal washer or orifice plate 52 which fits over the upper end of the gauge barrel 10 (as best seen in FIG. 1) through the medium of an annular step 54 indicated in FIG. 5. This metal washer 52 thus serves also as a stop to limit the piston assembly 30, 35 by reason of the contracting of the head 38 on the top of the stem 36 with the under side of the washer 52 at the locus of its central aperture 50 when the piston assembly is forced upwardly by the spring. In operation when the air pressure is relieved the spring 15 returns the piston 35, the self-sealing cup, and the cylinder to their upper position leaving the gauge bar 16 retained within the barrel 10 by means of the spring member 23. While the gauge bar is in that position, the portion of the scale projecting outwardly through the block is read to indicate the pressure of the air that caused the gauge bar to move outwardly through the block.

The construction and functioning of the self-sealing yieldable rubber cup 30 are important aspects of this improvement. The rubber cup 30 is molded from rubber to form a body which does not pass air therethrough. If preferred, some synthetic non-porous plastic may be used instead of the indicated rubber, so long as it has the yieldable characteristics for the present purpose, as above indicated.

It is particularly to be noted that the yieldable cup 30 is an integral construction including a base 60 which, in operation, bears upon the upwardly directed shoulder 46 of the piston 35. The cup 30 also includes an integral outer annular flange 62 which upstands from the base 60, and the previously mentioned frusto-conical sleeve 34 which upstands from the base 60 around the stem 36 of the piston 35 in tight sealing contact with the stem 36, the upper end of the frusto-conical sleeve 34 snapping under the head 38 of the stem 36 as indicated in FIG. 4. Thus, a tight seal is produced between the upstanding sleeve 34 and the stem 36 with its head 38. The upper portion of the upstanding annular flange 62 is integrally provided with an outer overhanging peripheral rib 64 which adjoins the underlying thinner wall portion of the flange 62. By reason of this construction, when the annular rib 64 is in the indicated operative position of FIG. 1, the applied air entering the annular air chamber 32 under pressure functions readily to force, expand, or compress the rib 64 outwardly into sealing engagement with the inner wall of the gauge barrel 10, and this action is facilitated by feathering the outer edge of the rib 64 as at 65. In this manner, since the lower portion of the cup 32 around its base 60 is peripherally flush with the periphery of the cylindrical portion 44 of the piston 35, thorough air-tight sealing by the rib portion 64 at the top of the cup 30 is assured. This may be further facilitated by reducing the thickness of the base 60 somewhat to form a thin annular wall portion 66 indicated in FIGS. 3 and 4.

By these means, adequate flexing and yielding of the various parts of the cup 30 to produce thorough and complete sealing contact against air loss during operations are made certain, and auxiliary means such as metallic springs and washers to expand the cup are eliminated.

Variations within the protection of the patent will become apparent to those skilled in this art and such are intended to be covered.

What is claimed is:

1. In an air pressure gauge of the type including a hollow barrel having upper and lower ends, a graduated gauge bar within said barrel adapted to be extended from the lower end thereof, a gauge spring disposed within said barrel in surrounding relation to said bar, and a gauge head at the upper end of said barrel having a passage for supplying pressurized air to said barrel; the improvement which comprises a plunger within said barrel, adjacent the upper end thereof, having an elongated generally cylindrical body portion including a lower end of tapered configuration inserted into the upper end of said spring and separably bearing on the upper end of said gauge bar, the upper end of said elongated cylindrical body portion having a generally cylindrical extension of larger diameter than said body portion formed integrally therewith, the upper side of said cylindrical extension including an integral upwardly directed central stem of frusto-conical configuration having an integral head spaced from said extension and separably engageable with stop means at the under side of said gauge head, the larger end of said frusto-conical stem being disposed adjacent the upper side of said cylindrical extension and being smaller in diameter than the upper side of said cylindrical extension thereby to define an upwardly directed annular shoulder around the larger end of said frusto-conical stem, the smaller end of said frusto-conical stem being spaced above the upper surface of said cylindrical extension and defining an under-cut at said head, a self-sealing cup of yieldable material mounted upon said upwardly directed annular shoulder of said cylindrical extension, said cup defining an annular substantially flat base portion bearing on said upwardly directed shoulder, said cup further defining a generally cylindrical flange portion integral with and upstanding from the outer edge of said annular base portion, said generally cylindrical flange portion having an outer diameter substantially equal to the diameter of said cylindrical extension, the uppermost edge of said cylindrical flange portion being thickened to define an outstanding annular rib adapted to sealingly engage the inner wall of said barrel, said cup further defining an axially located sleeve element of frusto-conical configuration integral with and upstanding from the inner edge of said annular base portion, said frusto-conical sleeve element tightly fitting around said frusto-conical stem in air sealing relationship thereto with the upper extremity of said frusto-conical sleeve being square cut and snapped under said under-cut head in air-sealing relationship thereto, the outer wall of said frusto-conical sleeve element and the inner wall of said cylindrical flange portion defining a tapered annular air chamber extending divergingly in an upward direction from said base portion and adapted to receive air under pressure from the passage in said gauge head, at least a part of said base portion being reduced in thickness relative to adjacent parts of said base portion to facilitate flexing of said flange portion and annular rib relative to said base portion and conical sleeve element when air under pressure is supplied to said tapered annular chamber.

2. The structure of claim 1 wherein the outer upper edge of said annular rib is feathered to facilitate sealing engagement between said rib and the inner wall of said barrel.

References Cited in the file of this patent
UNITED STATES PATENTS

| | | |
|---|---|---|
| 2,036,038 | Gottlieb | Mar. 31, 1936 |
| 2,081,040 | King | May 18, 1937 |
| 2,111,312 | Clark | Mar. 15, 1938 |
| 2,128,619 | Longstreet | Aug. 30, 1938 |
| 2,188,106 | Caldwell | Jan. 23, 1940 |
| 2,428,452 | Farmer | Oct. 7, 1947 |
| 2,596,856 | Krohn | May 13, 1952 |
| 2,686,445 | Keck | Aug. 17, 1954 |
| 2,865,695 | Mazeika | Dec. 23, 1958 |